United States Patent
Sigg et al.

(10) Patent No.: US 8,644,824 B1
(45) Date of Patent: Feb. 4, 2014

(54) TRACKING REGISTRATION BUFFER IN A CELLULAR NETWORK

(75) Inventors: Jason P. Sigg, Overland Park, KS (US); Maulik K. Shah, Overland Park, KS (US); Jasinder P. Singh, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 13/549,156

(22) Filed: Jul. 13, 2012

(51) Int. Cl.
*H04W 4/00* (2009.01)

(52) U.S. Cl.
USPC .................................. 455/435.1; 455/435.2

(58) Field of Classification Search
USPC ............. 455/435.1–435.2, 436, 456.1–456.5, 455/414.1, 458, 445, 404.2; 370/312, 328, 370/329; 709/203; 707/609
See application file for complete search history.

(56) References Cited

U.S. PATENT DOCUMENTS

| | | | |
|---|---|---|---|
| 6,870,820 B1* | 3/2005 | Forssell et al. | 370/328 |
| 6,968,196 B1* | 11/2005 | Back et al. | 455/456.5 |
| 2006/0121899 A1* | 6/2006 | Willey et al. | 455/435.1 |
| 2008/0045178 A1* | 2/2008 | Venkatachalam | 455/404.2 |
| 2010/0210269 A1* | 8/2010 | Shuai | 455/436 |
| 2010/0246467 A1* | 9/2010 | Song et al. | 370/312 |
| 2010/0325194 A1* | 12/2010 | Williamson et al. | 709/203 |
| 2011/0171975 A1* | 7/2011 | Yin | 455/456.2 |
| 2012/0195255 A1* | 8/2012 | Nylander et al. | 370/328 |

\* cited by examiner

*Primary Examiner* — Jinsong Hu
*Assistant Examiner* — Nathan Taylor

(57) ABSTRACT

Embodiments described herein may help to provide a delayed zone-update process. An exemplary method may involve a user entity, which is initially operating in a first of a plurality of multi-coverage-area zones in a radio access network (RAN), subsequently determining that the user entity has moved into a second multi-coverage-area zone of the RAN, wherein the user entity is located in a first coverage area of the second multi-coverage-area zone. In response, the user entity may refrain from sending a registration message to register in the second multi-coverage-area zone until the earlier of: (i) a threshold period of time elapsing and (ii) the user entity moving into another coverage area in the second multi-coverage-area zone that is different from the first coverage area.

19 Claims, 5 Drawing Sheets

TRACKING REGISTRATION BUFFER IN A CELLULAR NETWORK

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according IS-2000 and IS-856 standards, for example, the antenna system is referred to as a base transceiver system (BTS), and is usually under the control of a base station controller (BSC). In a universal mobile telecommunications system (UMTS) configured to operate according to Long Term Evolution (LTE) standards, the antenna system is usually referred to as an eNodeB, and the entity that typically coordinates functionality between multiple eNodeBs is usually referred to as a mobility management entity (MME). Other architectures and operational configurations of a RAN are possible as well.

A subscriber (or user) in a service provider's wireless communication system accesses the system for communication services via a communication device, such as a cellular telephone, "smart" phone, pager, or appropriately equipped portable computer, for instance. In a CDMA system the communication device is referred to as an access terminal (also referred to herein by "AT"); in an LTE system the communication device is referred to as user equipment (also referred to herein by "UE"). When an AT or UE is positioned in a cell, it communicates via an RF air interface with the BTS or eNodeB antenna of the cell. Consequently, a communication path or "channel" is established between the AT or UE and the transport network, via the air interface, the BTS or eNodeB, the BSC or MME, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or eNodeB, or by respective antennas. These sectors can be referred to as "physical sectors," since they are physical areas of a cell site. Therefore, at any given instant, an AT or UE in a wireless network will typically be positioned in a given physical sector and will be able to communicate with the transport network via the BTS or eNodeB serving that physical sector.

The functional combination of a BTS of a cell or sector with a BSC, or of an eNodeB (possibly in combination with an MME), is commonly referred to as a "base station." The actual physical configuration of a base station can range from an integrated BTS-BSC or eNodeB unit to a distributed deployment of multiple BTSs under a single BSC, or multiple eNodeBs under a single MME. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time.

OVERVIEW

In a radio access network (RAN), multi-coverage-area zones may be defined for various reasons. For example, in a CDMA network, paging zones that include multiple sectors may be defined to facilitate zone-based paging. As another example, tracking areas may be defined in an LTE network, with each tracking area including cells served by multiple eNodeBs. Other examples of multi-coverage-area zones are possible.

According to a typical configuration, a device may register with the RAN when the device enters a multi-coverage-area zone in which it is not currently registered. For example, according to LTE, a user entity (UE) may be registered in a number of tracking areas at a given point in time. As such, the UE and/or the RAN may keep a registered tracking area list which indicates the particular tracking areas in which the UE is registered. Thus, when the UE enters a new tracking area, which is not included on its registered tracking area list, the UE may register with the RAN in the new tracking area.

In a scenario where many devices are moving into a new tracking area (or another type of multi-coverage-area zone) at once, significant control-channel occupancy can result. Such an increase in control-channel occupancy may have undesirable effects. As a specific example, consider a scenario where a large number of UEs are moving into a new tracking area while exiting an arena after a sporting event has ended. In this scenario, registration signaling by the user entities may burden air-interface control channels to the point that other UEs in the same coverage area(s) will be unable to access the network. As another specific example, consider a scenario where a tracking area cuts across a highway that is near to a convention center. This arrangement may result in extensive registration signaling by UEs moving along that highway, which may burden air-interface control channels to the point that mobiles in the convention center will be unable to access the network. Other examples are possible as well.

An exemplary embodiment may help to avoid such surges in control-channel occupancy via use of a delayed zone-update process by some or all devices. In particular, some or all devices that are operating in an area may delay re-registering, upon entering a new multi-coverage-area zone, until the earlier of (i) a threshold time period passing and (ii) the device reaching a second coverage area in the new multi-coverage-area zone (e.g., a UE moving into a second cell in a new tracking area). In some cases, only a subset of devices is selected for such a delayed registration process. In such cases, the subset of devices could be selected based on an ESN-hashing function, or using another technique.

An exemplary delayed zone-update process may help to reduce the control-channel occupancy in coverage areas near an edge of a multi-coverage-area zone. Further, by delaying registration until the earlier of the threshold time passing or reaching the second coverage area in the zone, the process may help to prevent a device that does not move in a manner such that it moves into a second coverage area in the zone in a certain amount of time (e.g., two minutes), from delaying registration for an inordinately long period of time. Note, however, that in some embodiments a device may simply delay registering until it reaches a second coverage area in a new multi-coverage-area zone, regardless of how much time has passed since it entered the new multi-coverage-area zone.

In one aspect, an exemplary method may be implemented by a user entity that is initially operating in a first of a plurality of multi-coverage-area zones in a RAN. The method involves the UE subsequently determining that the user entity has moved into a second multi-coverage-area zone of the RAN, wherein the user entity is located in a first coverage area of the second multi-coverage-area zone. In response to determining that the user entity has moved into the new multi-coverage-area zone: (a) the user entity refraining from sending a registration message to register in the second multi-coverage-area zone until the earlier of: (i) a threshold period of time elapsing and (ii) the user entity moving into another coverage area in the second multi-coverage-area zone that is different from the first coverage area; and (b) the user entity subsequently sending the registration message to register in the second multi-coverage-area zone in response to the earlier of (i) the user entity determining that the user entity has remained in the first coverage area for the threshold period of time and (ii) the user entity determining that the user entity has moved into a second coverage area in the second multi-coverage-area zone.

In a further aspect, another exemplary method may be implemented by a user entity that is initially operating in a first of a plurality of multi-coverage-area zones in a RAN. The method involves the UE subsequently determining that the user entity has moved into a second multi-coverage-area zone of the RAN, wherein the user entity is located in a first coverage area of the second multi-coverage-area zone. In response to determining that the user entity has moved into the new multi-coverage-area zone: (a) the user entity refraining from sending a registration message to register in the second multi-coverage-area zone, at least until the user entity moves into another coverage area in the second multi-coverage-area zone that is different from the first coverage area; and (b) the user entity subsequently determining that the user entity has moved into a second coverage area in the second multi-coverage-area zone and responsively sending the registration message to register in the second multi-coverage-area zone.

In yet a further aspect, an exemplary computing system may include a non-transitory computer-readable medium and program instructions stored on the non-transitory computer-readable medium that are executable by at least one processor. The program instructions are executable to determine when a user entity that is initially operating in a first of a plurality of multi-coverage-area zones in a radio access network (RAN), subsequently moves into a second multi-coverage-area zone of the RAN, wherein the user entity is located in a first coverage area of the second multi-coverage-area zone. The program instructions are further executable to, in response to determining that the user entity has moved into the new multi-coverage-area zone: (a) refrain from sending a registration message to register in the second multi-coverage-area zone, at least until the user entity moves into another coverage area in the second multi-coverage-area zone that is different from the first coverage area; and (b) subsequently determine that the user entity has moved into a second coverage area in the second multi-coverage-area zone and responsively send the registration message to register in the second multi-coverage-area zone.

In another aspect, an exemplary RAN system may include a non-transitory computer-readable medium and program instructions stored on the non-transitory computer-readable medium that are executable by at least one processor. The program instructions are executable to (a) select a zone-update process for each of one or more user entities, wherein the zone-update process for each user entity is selected from a plurality of possible zone-update processes that include at least a first and a second zone-update process, wherein the first zone-update process comprises a delayed zone-update process; and indicate the respectively selected zone-update process to each user entity. The delayed zone-update process, when implemented by a given one of the user entities, may cause the given user entity to respond to movement into a first coverage area of a new multi-coverage-area zone of the RAN, in which the user entity has not yet registered, by waiting until the user entity moves into a second coverage area in the new multi-coverage-area zone that is different from the first coverage area, before sending a registration message to register in the new multi-coverage-area zone.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

1. Exemplary Network Architecture

Figure 1:
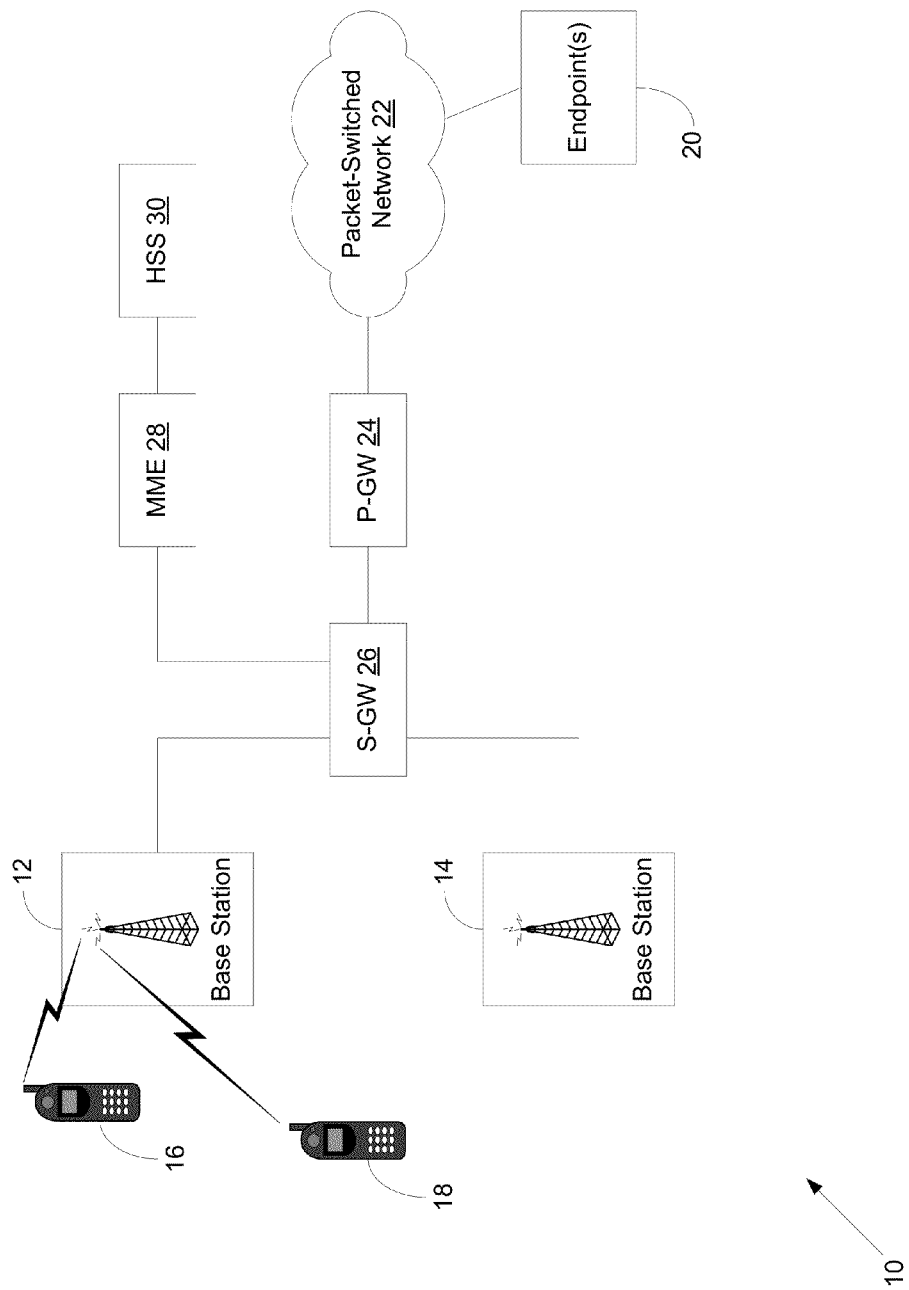
FIG. 1 is a simplified block diagram of a wireless telecommunications network in which exemplary embodiments may be employed.

FIG. 1 is a simplified block diagram of a wireless telecommunications network 10 in which exemplary embodiments may be employed. For purposes of illustration, FIG. 1 shows a network architecture that may be used in an LTE system. It is to be understood, however, that other network architectures could be used.

Wireless telecommunications network 10 may include a plurality of wireless access points, which are exemplified in FIG. 1 by base stations 12 and 14. In LTE terminology, base stations 12 and 14 may each correspond to an eNodeB, and thus may also be referred to as eNodeBs 12 and 14. Base stations 12 and 14 may each include a wireless coverage area within which the base station is able to wirelessly communicate with user devices, which may also be referred to as a cell, a sector, or a cell-sector. The wireless coverage areas of base stations 12 and 14 could be either overlapping or non-overlapping. Alternatively, the wireless coverage areas of base stations 12 and 14 could be co-extensive, or one wireless coverage area could be encompassed within another. Each wireless coverage area may correspond to a cell. A cell may, in turn, be subdivided into smaller wireless coverage areas, such as sectors. Although FIG. 1 shows wireless telecommunications network 10 with two base stations, it is to be understood that network 10 may include a greater or fewer number.

For purposes of illustration, base station 12 is shown in wireless communication with user devices 16 and 18, which may also be referred to as user entities (UEs) 16 and 18. User devices 16 and 18 could be wireless telephones, wireless e-mail devices, wirelessly-equipped computers (such as handheld, tablet, or laptop computers), or other types of wireless communication devices. In an exemplary embodiment, the wireless communications between base station 12 and user devices 16 and 18 involve OFDM signals on the downlink (communications transmitted from the base station to a user device) and on the uplink (communications from a user device to the base station). Although FIG. 1 shows base station 12 serving two user devices, it is to be understood, that a base station may serve a greater or fewer number of user devices at a particular point in time.

User devices 16 and 18 could be engaged in communication sessions with one or more endpoints(s) 20 via base station 12. Endpoint(s) 20 may include, for example, one or more voice-over-packet (VoP) communication devices, e-mail servers, messaging servers, streaming media servers, gaming servers, and/or Web servers. In an exemplary embodiment, endpoint(s) 20 are communicatively coupled to a packet-switched network 22. Thus, a communication session between a user device and endpoint(s) 20 may involve the exchange of packets containing voice, video, text, or other data.

To support user devices' communications through packet-switched network 22, wireless telecommunications network 10 may include a packet gateway (P-GW) 24. For example, P-GW 24 may allocate Internet Protocol (IP) addresses for user devices. P-GW 24 may exchange packets with base stations 12 and 14 via a serving gateway (S-GW) 26. S-GW 26 may also serve as an anchor point for communication sessions when user devices move between base stations.

Wireless telecommunications network 10 may also include one or more control nodes that control communications involving user devices, such as user devices 16 and 18. For example, network 10 may include a mobility management entity (MME) 28, which controls communications between user devices and S-GW 26. MME 28 may, in turn, be communicatively coupled to a home subscriber server (HSS) 30, which stores subscriber information.

Under LTE, UEs 16 and 18 may operate in one of three possible states, LTE DETACHED, LTE_IDLE, and LTE_ACTIVE. A UE 16 or 18 typically operates in the LTE_DETACHED state while it is searching for and registering with the network. A UE 16 or 18 typically operates in the LTE_ACTIVE state once it has registered with the network and has a radio resource control (RRC) connection with an eNodeB (e.g., while actively engaged in a communication). Further, a UE 16 or 18 typically operates in the LTE_IDLE state when it is registered, but is not engaged in a communication, and thus does not have an RRC connection. In an exemplary embodiment, a wireless telecommunications network 10 may be operable to page user devices 16 and 18 for various reasons. For example, when UE 16 or 18 is operating in the LTE_IDLE state (e.g., when the UE is not actively engaged in communication), MME 28 may receive an indication of an incoming communication directed to UE 16 or 18, or otherwise determine that communication with UE 16 or 18 is needed. Accordingly, MME 28 may send a paging request to the eNodeB or eNodeBs that are believed to be near the UE (e.g., base station 12 and/or base station 14), so that user device 16 or 18 can be paged.

More specifically, to facilitate the tracking and paging of a UE 16 or 18 in an LTE network, the LTE network may include a number of defined "tracking areas." Each tracking area includes a group of coverage areas (e.g., cells), which are typically contiguous. Further, a network may implement static non-overlapping tracking areas, overlapping tracking areas (e.g., where adjacent tracking areas share one or more cell), or a combination thereof, depending upon the particular implementation. Accordingly, an MME 28 may initiate the paging procedure by sending a paging message to each eNodeB that serves cells in the tracking area or tracking areas in which a UE 16 or 18 is currently registered.

Each UE 16 or 18 may maintain or have access to a tracking area list (a "TAI list"), which indicates the tracking area or areas in which the UE is currently registered. Accordingly, when a UE 16 or 18 enters a tracking area in which it is not currently registered it may implement a zone-update process to register in the new tracking area. Specifically, under LTE, the UE 16 or 18 may start a tracking-area update procedure when by sending the tracking area update request message to the RAN (e.g., to an MME or another network entity). The request message may indicate a Globally Unique Temporary ID (GUTI) which identifies the particular UE 16 or 18, as well as the TAI list for the UE 16 or 18.

If an MME 28 accepts a tracking area update request, the MME may send a tracking area update accept message to the UE. The tracking area update accept message may include a new GUTI and/or an updated TAI list, if either has changed. In response, the UE may send the MME 28 a tracking area update complete message. On the other hand, if the update request is not accepted, the MME 28 sends a tracking area update reject message, which may indicate a reason for the rejection.

Note that the tracking-area update procedure under LTE is described herein for illustrative purposes, and is but one example of a zone-update process via which a user device can register in a multi-coverage-area zone or zones. Exemplary embodiments may involve or relate to other types of zone-update processes, which may be implemented in an LTE network or in networks providing service under other air-interface communication protocols, without departing from the scope of the invention.

As noted above, scenarios may exist where a large number of UEs are moving into the same multi-coverage-area zone in a short period of time. Accordingly, UE 16 and/or 18 may be configured to implement a delayed zone-update process. Further, UE 16, UE 18, and other UEs may be configured such that some UEs utilize a delayed zone-update process, while others utilize a standard zone-update process in which the UEs register at once (e.g., by sending a tracking area update request message upon entering a new tracking area). In a scenario where many UEs are moving into the same multi-coverage-area zone in a short period of time, use of the delayed zone-update process by at least some of the UEs may help to avoid degradation of service quality in the multi-coverage-area zone. In particular, the delayed zone-update process may help to avoid over-burdening the control channel in the border cell or cells in the multi-coverage-area zone that a large number of UEs are moving into.

In an exemplary embodiment, MME 28 may include a non-transitory computer-readable medium having program instructions stored thereon, which are executable to provide functionality of an MME described herein. For example, the program instructions may be executable to select a zone-update process for each of one or more UEs, where the zone-update process for each user entity is selected from two or more possible zone-update processes. The possible zone-update processes may include at least a first and a second zone-update process (with the first zone-update process being a delayed zone-update process). The program instructions may be further executable to indicate the respectively selected zone-update process to each user entity (e.g., by sending from the MME to each UE that indicates which zone-update process should be implemented by the particular UE).

Note that in some embodiments, such as the example provided above, the above-described program instructions may be included in an MME in an LTE network. However, the same or similar program instructions, or portions thereof, may be included in other components of an LTE network and/or included in RAN components in other types of networks (e.g., in an MSC that is part of a CDMA network).

Figure 2:
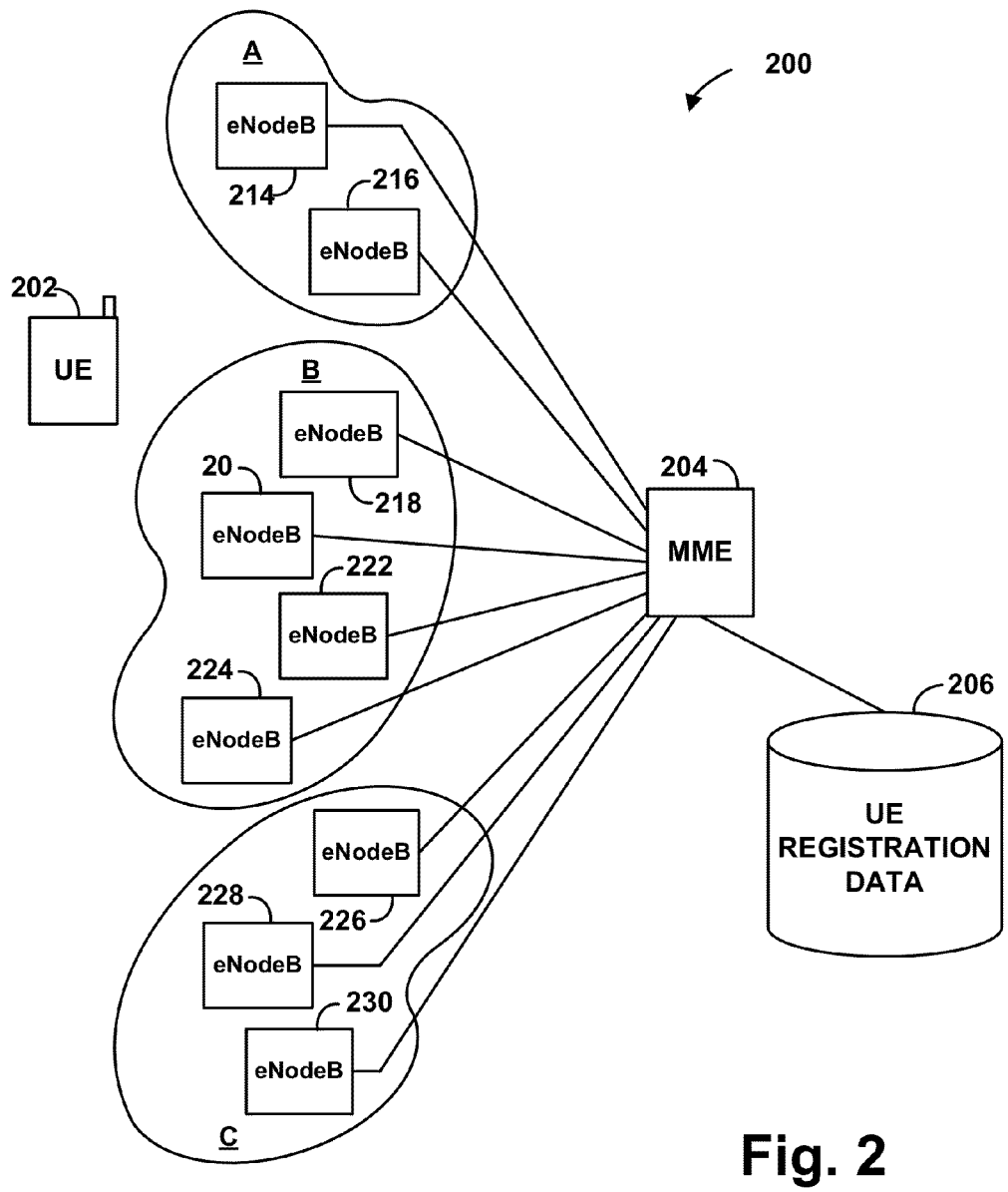
FIG. 2 is a block diagram illustrating a portion of the coverage area of an LTE access network, which includes tracking areas.

FIG. 2 is a block diagram illustrating a portion of the coverage area of an LTE access network 200, which includes tracking areas. As shown, access network 200 includes eNodeBs 214-230, which are grouped into three different tracking areas A, B, and C to facilitate the paging of UE 202. In particular, tracking area A includes eNodeBs 214 to 216, tracking area B includes eNodeBs 218 to 224, and tracking area C includes eNodeBs 226 to 230.

As further shown, MME 204 includes or has access to UE registration database 206. The UE registration database 206 may include data that specifies which UEs are registered in which tracking areas. UE registration data 206 may also include other types of data and/or may provide other information. Accordingly, when MME 204 needs to page UE 202, MME 204 may access or request registration data for UE 202 from UE registration database 206.

In a further aspect, a UE may register in one or more tracking areas, including the tracking area in which the UE is located and/or one or more tracking areas in which the UE was recently located, so as to keep the network updated as to the tracking area or tracking areas where the UE should be paged. Thus, when MME 28 determines that a given UE 102 should be paged, MME 28 may send a paging request to the eNodeB or eNodeBs in the tracking area or areas in which the given UE is registered. For example, if UE 102 is registered in tracking area A, then MME 28 may send a paging request for UE 102 to eNodeBs 14 to 16. Other examples are also possible.

2. Exemplary Methods

Figure 3A:
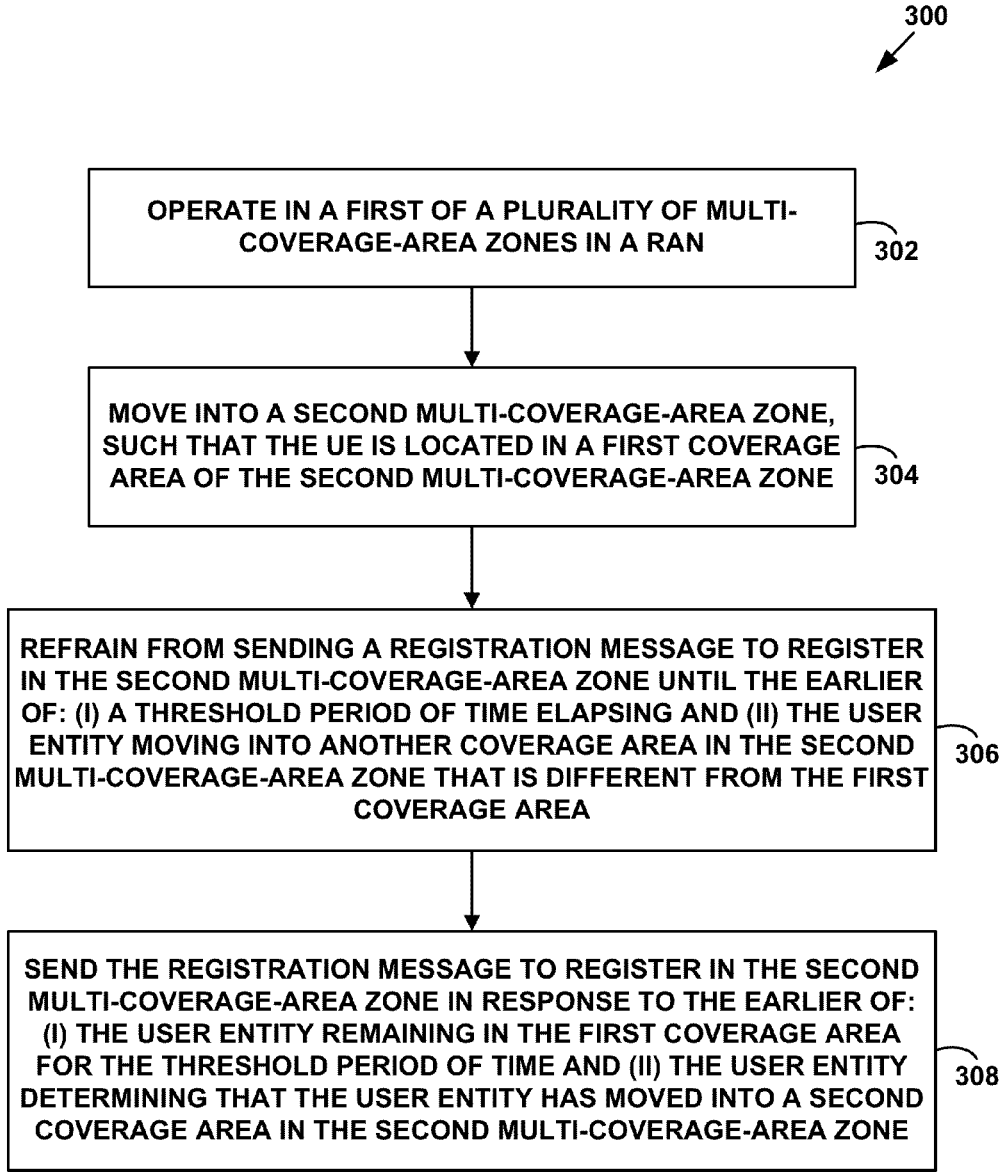
FIG. 3A is a flow chart illustrating a method, according to an exemplary embodiment.

FIG. 3A is a flow chart illustrating a method 300, according to an exemplary embodiment. Method 300 may be implemented by a wireless communication device to delay registration when the device enters a new multi-coverage-area zone of a RAN. Note that for purposes of illustration, exemplary method 300 is described with reference to an LTE system, such as wireless telecommunications network 100 shown in FIG. 1. For example, method 300 may be implemented by a UE in an LTE network, in order to delay sending a tracking area update request message when it enters a tracking area that is not included in the UE's registered tracking area list.

It is to be understood, however, that other network architectures and other wireless communications protocols could be used. For example, method 300 could also be applied by user devices (e.g., a mobile stations or wireless communication devices) operating in IEEE 802.11 (WiFi) systems, IEEE 802.16 (WiMAX) systems, GSM systems, and/or other CDMA systems, such as IS-2000 or EV-DO systems. As a specific example, a mobile station in a CDMA network could implement method 300 to delay registering with the RAN when it enters a new paging zone. Other examples are also possible.

Referring to FIG. 3A, method 300 may be carried out by a user entity that is initially operating in a first of a plurality of multi-coverage-area zones in a RAN (e.g., in a first tracking area), as shown by block 302. At some subsequent point in time, the user entity may determine that it has moved into a second multi-coverage-area zone, and is located in a first coverage area (e.g., a first cell) of the second multi-coverage-area zone), as shown by block 304. According to an exemplary embodiment, the user entity may delay sending a registration message in the second multi-coverage-area zone, instead of automatically sending the registration message upon entering the second multi-coverage-area zone.

More specifically, in response to determining that it has moved into the second multi-coverage-area zone, the user entity may refrain from sending a registration message to register in the second multi-coverage-area zone until the earlier of: (i) a threshold period of time elapsing and (ii) the user entity moving into another coverage area in the second multi-coverage-area zone that is different from the first coverage area, as shown by block 306. As such, the user entity may send the registration message to register in the second multi-coverage-area zone in response to the earlier of: (i) the user entity remaining in the first coverage area for the threshold period of time and (ii) the user entity determining that the user entity has moved into a second coverage area in the second multi-coverage-area zone, as shown by block 306.

Figure 3B:
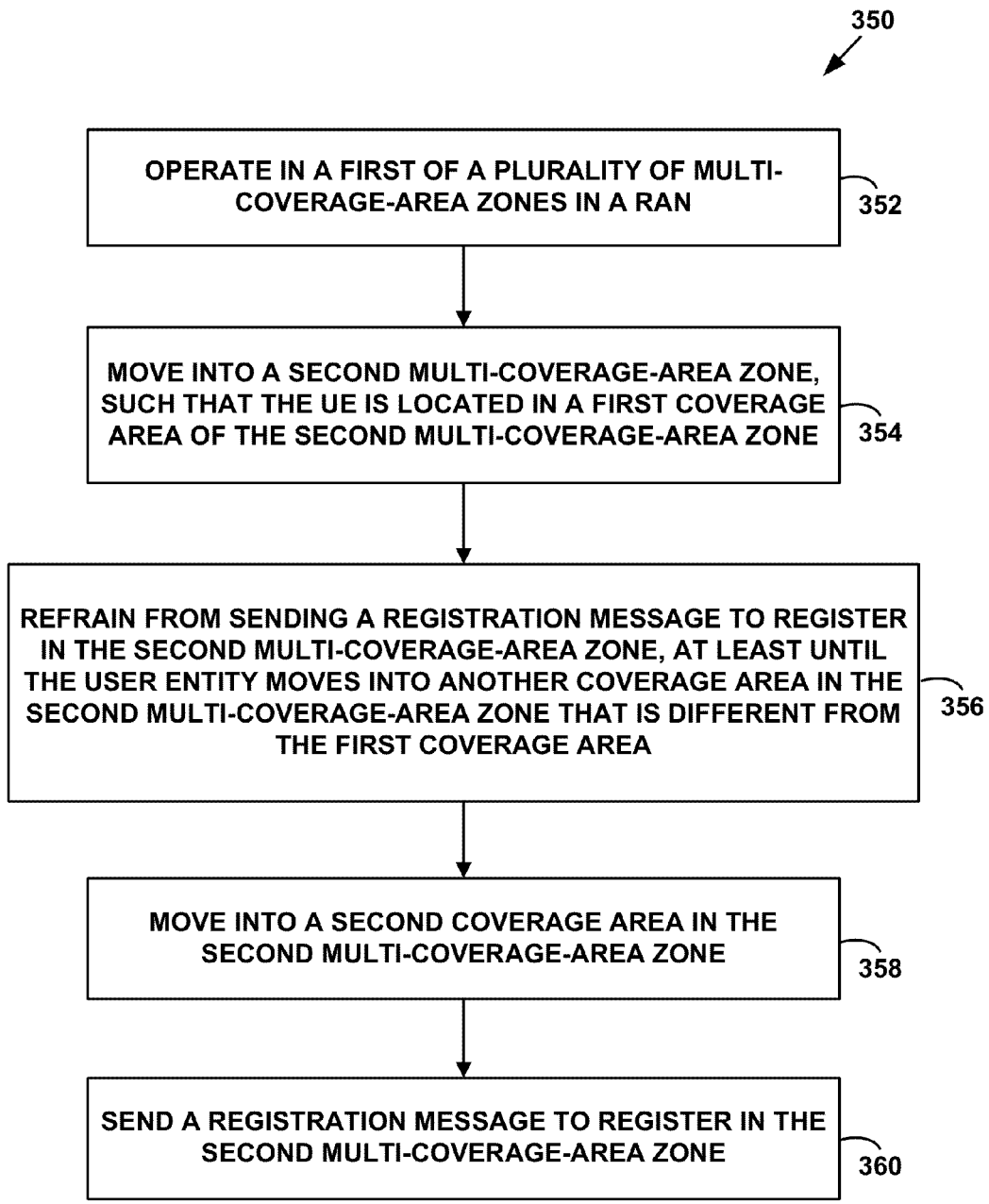
FIG. 3B is another flow chart illustrating a method 350, according to an exemplary embodiment.

In some embodiments, a user entity may not implement a timer when it enters a new multi-coverage-area zone. Instead, the UE may simply delay until it moves into a second coverage area in the new multi-coverage-area zone, before sending a registration message for the new multi-coverage-area zone. For example, FIG. 3B is another flow chart illustrating a method 350, according to an exemplary embodiment. FIG. 3B illustrates how a UE can delay registering when it enters a new multi-coverage-area zone, without use of a timer.

More specifically, a UE that is initially operating in a first of a plurality of multi-coverage-area zones in a RAN, as shown by block 352, may subsequently determine that it has moved into a second multi-coverage-area zone, and is located in a first coverage area of the second multi-coverage-area zone, as shown by block 354. Then, in response to determining that it has moved into the second multi-coverage-area zone, the user entity may refrain from sending a registration message to register in the second multi-coverage-area zone, at least until the user entity moves into another coverage area in the second multi-coverage-area zone that is different from the first coverage area, as shown by block 356. As such, the UE may subsequently determine when it moves into a second coverage area in the second multi-coverage-area zone, as shown by block 358, and responsively send a registration message to register in the second multi-coverage-area zone, as shown by block 360.

In some embodiments, a UE may determine when it moves into a new multi-coverage-area zone by detecting when it moves across a border between a first multi-coverage-area zone and a second multi-coverage-area zone, into a first coverage area in the second multi-coverage-area zone. However, it is also possible that method 300 or 350 could be implemented in a RAN with overlapping coverage areas (e.g., overlapping cells or sectors). In such an implementation, the UE may conclude that it has moved into a new multi-coverage-area zone when it determines that it is located within the multi-coverage-area zone.

A UE may determine that it is located within the multi-coverage-area zone in various ways. For example, a UE may determine that it is within a given multi-coverage-area zone when it receives a signal (e.g., a pilot signal) from a base station (e.g., an eNodeB) that serves a coverage area within the multi-coverage-area zone. Additionally or alternatively, a UE may determine its own geographic location (e.g., GPS coordinates), and then determine that it is located within an area that is pre-defined as being part of a particular multi-coverage-area zone. Other techniques for identifying that the UE is in a particular multi-coverage-area zone are also possible.

Figure 4:
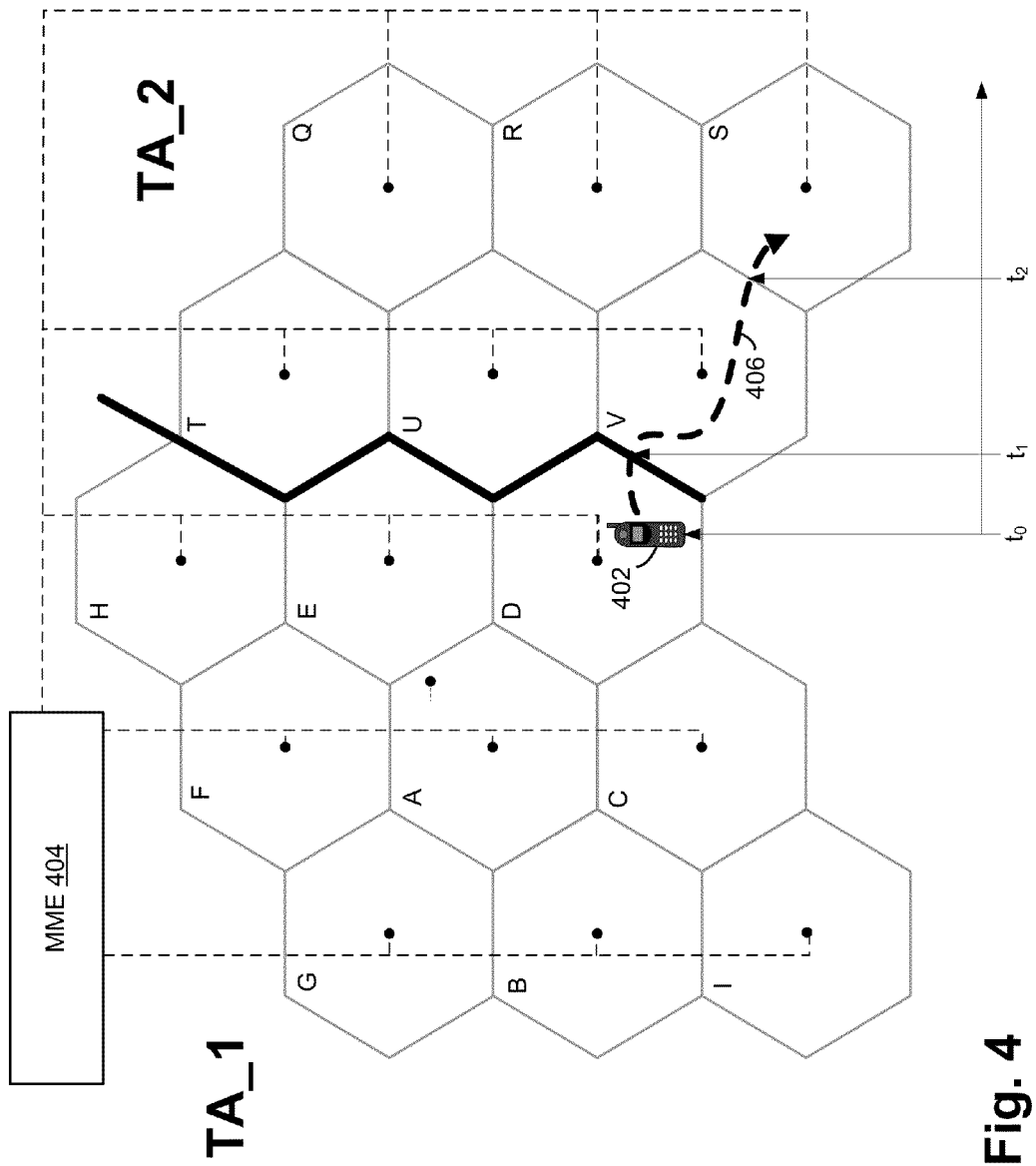
FIG. 4 is a simplified block diagram showing a portion of a radio access network in which an exemplary method could be implemented.

FIG. 4 is a simplified block diagram showing a portion of a RAN 400 in which an exemplary method could be implemented. As shown, a user entity 402 is operating in a coverage area that is served by an MME 404. Note that MME 404 may be thought of as an example of a "serving system." Other examples of a serving system may include, but are not limited to, an MSC in CDMA network and other types of switches. Such serving systems may also include other RAN entities that operate together with a switch to provide service in the switch's coverage area of the switch.

In the illustrated configuration, MME 404 is configured to facilitate services in a larger coverage area that includes smaller coverage areas A to I and coverage areas Q to V, which may also be referred to as cells A to I and cells Q to V. To track and page user entities, tracking areas may be defined within RAN 400. Specifically, FIG. 4 shows tracking areas TA_1 and TA_2. As shown, tracking area TA_1 includes cells A to I, and tracking area TA_2 includes cells Q to V.

Note that tracking areas TA_1 and TA_2 are described in terms of coverage areas included in the tracking area. In practice, tracking areas can also be described as being defined by the particular eNodeBs (or the particular base stations of another type) that serve the tracking area. It should therefore be understood that a description of a tracking area including particular cells, may apply equally to a tracking area that includes particular eNodeBs (or particular base stations of another type). For example, tracking area TA_1 may be defined by the eNodeBs that serve cells A to I, and tracking area TA_2 may be defined by the eNodeBs that serve cells Q to V.

In a further aspect, FIG. 4 illustrates a movement of UE 402 through the coverage area of RAN 400, along path 406. Specifically, at time $t_0$, UE 402 is located in cell D of tracking area TA_1. As UE 402 moves along path 406, UE 402 moves from cell D to cell V at time $t_1$. Since cell V is part of tracking area TA_2, UE 402 may detect, at or near time $t_1$, that it has moved into a new tracking area TA_2.

According to an exemplary embodiment, when UE 402 moves into a new tracking area (e.g., tracking area TA_2), UE 402 does not immediately register in tracking area TA_2. Instead, UE 402 may wait until it moves into a second cell in TA_2, before sending a registration message to register in tracking area TA_2. For example, as UE 402 continues to move along path 406, UE 402 moves into cell S at time $t_2$. Since cell S is also part of tracking area TA_2, UE 402 may responsively send a registration message to register in tracking area TA_2, at or near time $t_2$.

Note that in some implementations, UE 402 may implement a timer, such that it delays registering in a new tracking area TA_2, but not for more than a predetermined period of time. For example, if UE 402 implements method 300 of FIG. 3, then upon determining that it is in tracking area TA_2 (e.g., at or near time $t_1$), UE 402 may start a timer that runs for a predetermined period of time, and refrain from sending a registration message for tracking area TA_2 until either: (i) a threshold period of time elapses (e.g., the timer expires) or (ii) the UE 402 moves into another cell in tracking area TA_2. For example, if UE 402 remains in cell V for a predetermined period of time after time $t_1$ (e.g., if the duration of the timer is less than the period of time between time $t_1$ and time $t_2$), then UE 402 may send a registration message for tracking area TA_2 upon remaining in cell V for the predetermined period of time (e.g., upon the timer expiring).

In a further aspect, UE 402 may carry out the above-described method whenever UE 402 enters a new multi-coverage-area zone (e.g., a new tracking area). However, in some embodiments, UE 402 may register in a number of multi-coverage-area zones at once. For example, under LTE, UE 402 could maintain a registered tracking area list, which includes a number of tracking areas in which UE 402 has registered. In such an embodiment, UE 402 may only carry out an exemplary method when it determines that it has moved into a new multi-coverage-area zone, and determines that the multi-coverage-area zone is not already part of its registered tracking area list.

In a further aspect, there may be scenarios where it is useful for some UEs to delay registering in a new multi-coverage-area zone, and for others to register immediately upon entering a new multi-coverage-area zone. As such, a RAN may be configured to determine whether a given UE should use a first zone-update process in which the UE delays registration upon entering a new multi-coverage-area zone, or a second zone-update process in which the UE immediately registers upon entering a new multi-coverage-area zone.

For example, referring back to FIG. 1, UEs 16 and 18 (and possibly other UEs that are not shown in FIG. 1) may be configured to implement at least two different zone-update processes. In an exemplary embodiment, a first zone-update process may be a delayed zone-update process, according to which the UE delays registration in new multi-coverage-area zones.

For example, the first zone-update process may be or include method 300 or method 350 as described above. The second registration process may be a standard or default zone-update process, in which a UE responds to movement into a new multi-coverage-area zone of the RAN, in which the UE has not yet registered, by registering in the new multi-coverage-area zone (i.e., without waiting until it moves into another coverage area in the new multi-coverage-area zone or waiting until a timer expires).

Accordingly, an MME 28 and/or other network component(s) may be configured to instruct UEs such that some UEs utilize a first zone-update process (e.g., a delayed zone-update process), while others may be instructed to (or simply allowed to) utilize a second zone-update process (e.g., a standard zone-update process). Note that in some embodiments, MME 28 may only provide instructions to those UEs that are selected to implement the delayed zone-update process, thus allowing the remaining UEs to continue implementing the default zone-update process. Alternatively, MME 28 may send a message to each UE indicating the particular zone-update process it should implement (e.g., either the delayed or standard zone-update process).

In some embodiments, an MME 28 may identify a certain number or percentage of UEs to implement the delayed zone-update process. Further, the MME 28 may dynamically determine when it is appropriate to for at least some UEs in a given coverage area to implement a delayed zone-update process, or, alternatively, whether to allow all UEs in the coverage area to use a standard zone-update process. For example, MME 28 may determine that a certain number or percentage of UEs in a given cell should implement a delayed zone-update process based on a factor or factors such as the control-channel occupancy in the given cell, the control-channel occupancy in an adjacent cell, a cell including or being near to an area where a certain event is occurring or is anticipated (e.g., a cell serving a stadium where a sporting event is about to end). For example, all UEs that are located such that they are likely to move into a new tracking area may implement a standard zone-update process, unless the control-channel occupancy in a border cell or border cells in the new tracking area are above a threshold level. Other examples are also possible.

Further, when only some UEs in an area are instructed to use a delayed zone-update process, an MME may use various techniques to determine which particular UEs should use the delayed zone-update process. For example, an MME 28 could utilize a hashing function based on an identifier of each user device (e.g., the GUTI of a UE or the ESN of a mobile station) to determine whether or not to instruct the particular user device to implement a delayed zone-update process. Other examples are also possible.

Thus, referring back to FIGS. 3A and 3B, an exemplary method may further involve a UE receiving a message that indicates that it should implement the method 300 or 350 instead of a standard zone-update process (e.g., a zone-update process according to which the user entity sends a registration message in a new multi-coverage-area zone in response to determining that the user entity has moved into a new multi-coverage-area zone).

In a further aspect, UEs 16 or 18 could also be configured to determine whether or not to implement a standard or delayed zone-update process. For example, a UE may select either a first or second zone-update process from a number of possible zone-update processes, where the first zone-update process is a method such as method 300 or method 350, and the second zone-update process is a standard zone-update process. Further, a UE could implement the functionality described above in reference to an MME, such as utilizing a hash function to determine whether it should use a delayed zone-update process, to determine whether to utilize a standard or delayed zone-update process.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A computer-implemented method comprising:
at a user entity that is initially operating in a first of a plurality of tracking areas in a radio access network (RAN), subsequently determining that the user entity has moved into a first coverage area of a second tracking area in the RAN in which the user entity is not registered;
determining that the second tracking area that is not included in a tracking area list (TAI list) of the user entity; and
in response to determining that the second tracking area that is not included in the TAI list:
(a) the user entity refraining from sending a registration message to register in the second tracking area until the earlier of: (i) a threshold period of time elapsing and (ii) the user entity moving into another coverage area in the second tracking area that is different from the first coverage area; and (b) the user entity subsequently sending the registration message to register in the second tracking area in response to the earlier of (i) the user entity determining that the user entity has remained in the first coverage area of the second tracking area for the threshold period of time and (ii) the user entity determining that the user entity has moved into a second coverage area in the second tracking area.

2. The method of claim 1, wherein the RAN provides service under a Long Term Evolution (LTE) protocol.

3. The method of claim 1, wherein a first zone-update process includes the method of claim 1, and wherein the method further comprises:
the user entity selecting the first zone-update process from a plurality of possible zone-update processes, wherein the plurality of possible zone-update processes comprise at least the first zone-update process and a second zone-update process; and
the user entity performing the method of claim 1 in accordance with the selection of the first zone-update process.

4. A computer-implemented method comprising:
at a user entity that is initially operating in a first of a plurality of tracking areas in a radio access network (RAN), subsequently determining that the user entity has moved into a first coverage area of a second tracking area of the RAN in which the user entity is not registered;
determining that the second tracking area that is not included in a tracking area list (TAI list) of the user entity; and
in response to determining that the second tracking area that is not included in the TAI list:
(a) the user entity refraining from sending a registration message to register in the second tracking area, at least until the user entity moves into another coverage area in the second tracking area that is different from the first coverage area; and
(b) the user entity subsequently determining that the user entity has moved into a second coverage area in the second tracking area and responsively sending the registration message to register in the second tracking area.

5. The method of claim 4, further comprising:
the user entity receiving a message that indicates that the user entity should implement the method of claim 1 instead of a zone-update process according to which the user entity sends a registration message in a new tracking area in response to determining that the user entity has moved into a new tracking area; and
the user entity performing the method of claim 4 in response to receiving the message.

6. The method of claim 4, wherein a first zone-update process includes the method of claim 1, and wherein the method further comprises:
the user entity selecting the first zone-update process from a plurality of possible zone-update processes, wherein the plurality of possible zone-update processes comprise at least the first zone-update process and a second zone-update process; and
the user entity performing the method of claim 5 in accordance with the selection of the first zone-update process.

7. The method of claim 6, wherein the second zone-update process is a zone-update process according to which the user entity sends a registration message in response to determining that the user entity has moved into a new tracking area.

8. The method of claim 6, wherein the second zone-update process is a zone-update process according to which the user entity sends a registration message in response to determining that the user entity has moved into a tracking area in which the user entity is not registered.

9. The method of claim 6, wherein the user entity uses a hashing function to select the first zone-update process from the plurality of possible zone-update processes.

10. The method of claim 4, wherein the user entity conditions the sending of the registration message upon a determination that the user entity has not yet registered with the RAN in the new tracking area.

11. The method of claim 10, further comprising, in response to determining that the user entity has moved into the new tracking area, the user entity determining whether or not the user entity has not yet registered with the RAN in the new tracking area.

12. A radio access network (RAN) system comprising:
a non-transitory computer-readable medium; and
program instructions stored on the non-transitory computer-readable medium and executable by at least one processor to:
  select a zone-update process for each of one or more user entities, wherein the zone-update process for each user entity is selected from a plurality of possible zone-update processes that include at least a first and a second zone-update process, wherein the first zone-update process comprises a delayed zone-update process, wherein the delayed zone-update process, when implemented by a given one of the user entities, causes the given user entity to respond to movement into a first coverage area of a new tracking area of the RAN in which the user entity has not yet registered, by waiting until the user entity moves into a second coverage area in the new tracking area that is different from the first coverage area, before sending a registration message to register in the new tracking area; and
  indicate the respectively selected zone-update process to each user entity.

13. The system of claim 12, wherein the delayed zone-update process, when implemented by a given one of the user entities, causes the given user entity to respond to movement into a first coverage area of a new wherein the delayed zone-update process, when implemented by a given one of the user entities, causes the given user entity to respond to movement into a first coverage area of a new tracking area of the RAN, in which the user entity has not yet registered, by waiting until the user entity moves into a second coverage area in the new multi-coverage-area zone that is different from the first coverage area, before sending a registration message to register in the new tracking area of the RAN, in which the user entity has not yet registered, by waiting until the earlier of: (i) a threshold period of time elapsing and (ii) the user entity moving into a second coverage area in the new tracking area that is different from the first coverage area, before sending a registration message to register in the new tracking area.

14. The system of claim 12, wherein the second zone-update process, when implemented by a given user entity, causes the given user entity to respond to moving into a first coverage area of a new tracking area of the RAN, in which the user entity has not yet registered, by sending a registration message to register in the new tracking area, without waiting until the user entity moves into a second coverage area in the new multi-coverage-area zone.

15. The system of claim 12, further comprising program instructions stored on the non-transitory computer-readable medium and executable by at least one processor to:
  for each user entity, perform a hashing function to determine whether to select the first or the second zone-update process for the user entity.

16. The system of claim 12, further comprising program instructions stored on the non-transitory computer-readable medium and executable by at least one processor to: select the first zone-update process for a predetermined number or percentage of the one or more user entities.

17. The system of claim 12, wherein the one or more user entities are located in a given cell of the RAN, the system further comprising program instructions stored on the non-transitory computer-readable medium and executable by at least one processor to condition the selection of a zone-update process for each of the one or more user entities upon a determination that a control-channel occupancy in the given cell or a cell that is adjacent to the given cell is above a threshold occupancy level.

18. The system of claim 12, wherein the one or more user entities are located in a given cell of the RAN, the system further comprising program instructions stored on the non-transitory computer-readable medium and executable by at least one processor to condition the selection of a zone-update process for each of the one or more user entities upon a determination that a certain event is occurring or is anticipated in the given cell or in a cell that is adjacent to the given cell.

19. A computer-implemented method comprising:
at a user entity that is initially operating in a first of a plurality of paging zones in a radio access network (RAN), wherein each paging zone comprises a set of one or more coverage areas, subsequently determining that the user entity has moved into a first coverage area of a second paging zone in the RAN;
determining that the user entity is not registered in the second paging zone; and
in response to determining that the user entity is not registered in the second paging zone:
  (a) the user entity refraining from sending a registration message to register in the second paging zone until the earlier of: (i) a threshold period of time elapsing and (ii) the user entity moving into another coverage area in the second paging zone that is different from the first coverage area; and
  (b) the user entity subsequently sending the registration message to register in the second paging zone in response to the earlier of (i) the user entity determining that the user entity has remained in the first coverage area of the second paging zone for the threshold period of time and (ii) the user entity determining that the user entity has moved into a second coverage area in the second paging zone.

* * * * *